April 19, 1966   C. B. KREKELER   3,246,930
MEANS FOR HOLDING TOOL SHANKS IN SOCKET MEMBERS
Filed Aug. 14, 1961   2 Sheets-Sheet 1
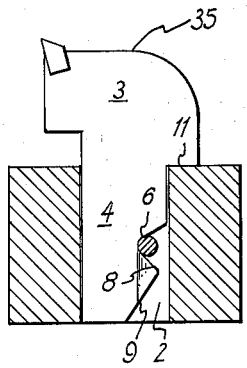
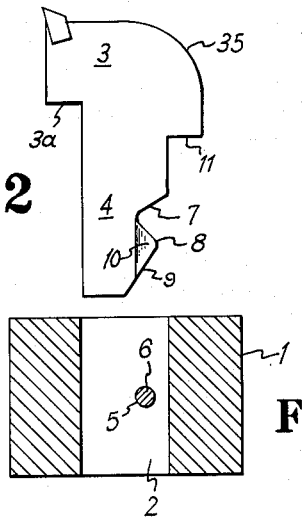
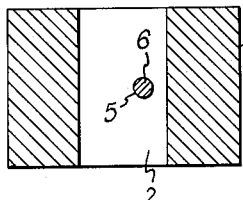
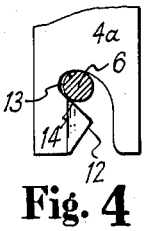
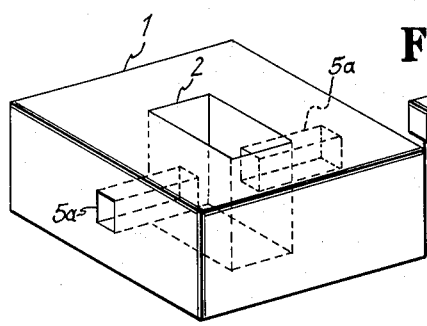
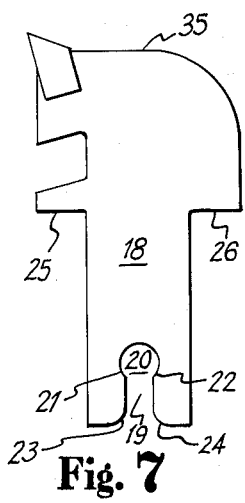
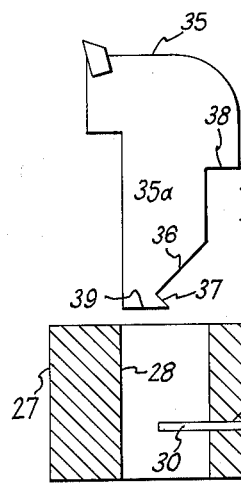
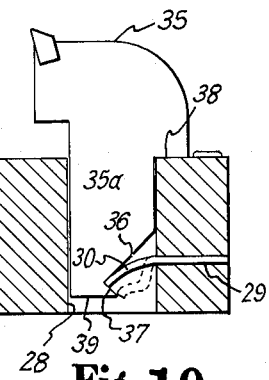
INVENTOR.
CLAUDE B. KREKELER,
BY Allen + Allen
ATTORNEYS.

April 19, 1966 C. B. KREKELER 3,246,930
MEANS FOR HOLDING TOOL SHANKS IN SOCKET MEMBERS
Filed Aug. 14, 1961 2 Sheets-Sheet 2
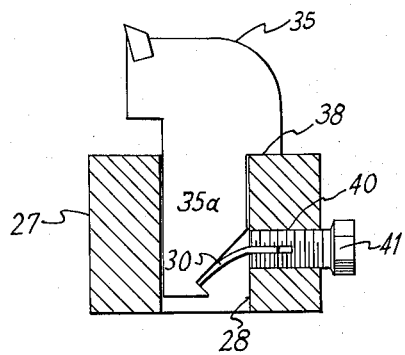
Fig. 11
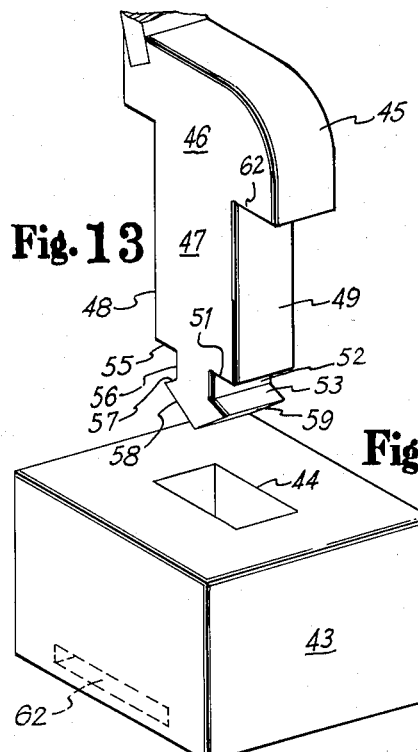
Fig. 13
Fig. 12
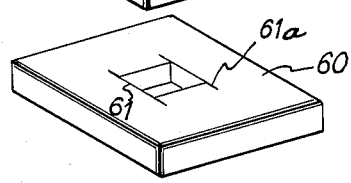
Fig. 14
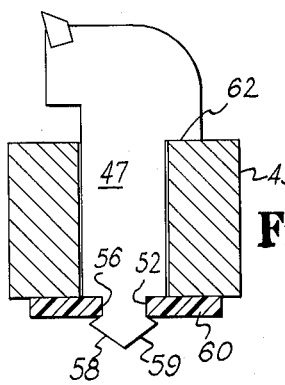
Fig. 15
INVENTOR.
CLAUDE B. KREKELER
BY Allen & Allen
ATTORNEYS.

United States Patent Office 3,246,930
Patented Apr. 19, 1966

3,246,930
MEANS FOR HOLDING TOOL SHANKS IN SOCKET MEMBERS
Claude B. Krekeler, Hamilton County, Ohio, assignor to The Cincinnati Mine Machinery Co., Cincinnati, Ohio, a corporation of Ohio
Filed Aug. 14, 1961, Ser. No. 131,283
9 Claims. (Cl. 299—92)

This invention relates to the problem of retaining the shanks of cutting tools in shank-receiving perforations in socket members, and of releasing the shanks therefrom, in simple and rapid operations. The invention will be described in connection with mining machinery, wherein frequent changes of the cutting tools are required. In the recent past the shanks of cutting tools or tool holders were held in the perforations of socket members by set screws. This not only made tool changes laborious, time consuming, and expensive, but did not always provide secure retention since set screws frequently became loosened under the excessive vibrations to which mining machinery elements are subjected in use.

More recently work has been done on retaining the shanks within the perforations by means having a resilient action so that it becomes possible to remove a worn bit or cutting tool by a prying action, and to install a fresh tool by inserting its shank in the perforations and driving the shank to seating position by a blow on the tool head. The engagement means heretofore employed have been rigid members extending into the perforations of the socket members and mounted for yielding movement in part at least by resilient means located in or on the socket members at positions outside the perforations.

It is a principal object of this invention to provide a type of holding means wherein a deformable structure directly engages the bit shank.

It is also an object of the invention to provide a structure wherein resilient or deformable means engaging the bit shank are displaceable within the perforation or outside it, permitting the desirable ready installation and removal of the cutting tools. Thereby are attained advantages in simplicity, ready renewability, and cost as will hereinafter appear.

The above objects and others which will be set forth later or will be apparent to one skilled in the art on reading these specifications are attained in that certain construction and arrangement of parts of which exemplary embodiments will now be described. Reference is made to the accompanying drawings wherein:

FIG. 1 is a longitudinal sectional view of a socket member with a resiliently acting retaining means in connection therewith.

FIG. 2 is an elevational view of a cutting bit of a type suitable for use in the socket member of FIG. 1.

FIG. 3 is again a sectional view showing the cutting bit engaged in the socket member.

FIG. 4 is a fragmentary elevation of the shank of another cutting tool which may be used in the construction of the foregoing figures.

FIG. 5 is a perspective view of a socket member fitted for the reception of another type of resilient engagement means.

FIG. 6 is a perspective view of the resilient engagement means.

FIG. 7 is an elevational view of a cutting tool with a shank adapted to coact with the means of FIG. 6.

FIG. 8 is a sectional view of a socket member with another resilient retaining means.

FIG. 9 is an elevational view of a cutting tool adapted for use in the socket member of FIG. 8.

FIG. 10 is a sectional view of the socket member of FIG. 8 with the cutting tool of FIG. 9 engaged therein.

FIG. 11 is a sectional view of a modified socket member and resilient retaining means, and including a cutting tool.

FIG. 12 is a perspective view of a socket member adapted for use with another resilient retaining means.

FIG. 13 is an elevational view of a cutting tool adapted for use therein.

FIG. 14 is a perspective view of a resilient retaining means adapted for use in the socket member of FIG. 12.

FIG. 15 is a sectional showing of the parts of FIGS. 12, 13 and 14 in assembly.

In the practice of one aspect of this invention, engagement means are provided within the perforation of a socket member, the engagement means being themselves of resilient and displaceable character, the displacement occurring inside the perforation so that, while the engagement means is held to the socket member in ways hereinafter set forth, the engagement means is not itself resiliently mounted with respect to the socket member.

Reference is made now to FIGS. 1–3 inclusive wherein 1 represents a socket member having a perforation 2 to receive the shank of a cutter bit. The term "cutter bit" as used herein is intended to embrace both a unitary structure consisting of a head and a shank with a cutting point on the head, and also bit holder structures as known in the art comprising a head and a shank, and wherein the head is arranged to accept and retain renewable cutter bit structures. For purposes of an exemplary showing, a unitary cutter bit is indicated having a head 3 and a shank 4.

The socket member 1 has a relatively small hole 5 extending transversely across the width of the socket member and intersecting the shank receiving perforation 2. A resiliently deformable rod-like member 6 is placed in the hole 5 so that while its ends will be engaged in the socket member 1, its central portion will extend freely across the perforation 2. The precise placement of the resilient member 6 may be varied for different purposes, as will be understood by the skilled worker in the art in the light of the description which follows. The resilient member may be a member of springy metal, such as steel, Phosphor bronze, or other alloys; but it may also be made of resilient, tough, wear-resistant plastic material such as nylon and the like. End portions of the resilient element 6 will be engaged in the end portions of the hole 5, and this engagement may be sufficiently tight to hold the element in position. It does not amount to a departure from the spirit of the invention, however, to provide on the outer sides of the socket member 1 removable plates, clips or like means to prevent endwise displacement of the resilient element 6. Yet again the resilient element 6 may be provided with a head on one end and a cotter pin or other fastening means on the other.

The cutter bit is provided with a notch 7 having an engagement surface 8. Below this surface there is a chamfered surface 9 which will deflect the resilient element 6; and that portion of the bit shank which lies between the surfaces 8 and 9 just described may be relieved laterally slantwise as indicated at 10 in order to eliminate any shearing effect on the element 6.

As will be evident to one skilled in the art, the arrangement is such that when the shank 4 of the cutter bit is inserted in the perforation 2 of the socket member, and the bit driven home by a blow from a suitable tool on the bit head, the resilient element 6 will first be deflected within the perforation 2 of the socket member by the surface 9. It will then pass the hump between the surfaces 8 and 9, and will come to rest on the slanting surface 8 still in a sufficiently deflected position to exert a downward force on the bit shank. The bit will be provided with one or more gauge-determining abutments 11 which will limit the descent of the shank in the perforation. The above mentioned relieved portion of the shank 4 between the surfaces 8 and 9 will cause the bit shank to have a narrower cross sectional configuration in that area. This in turn, will tend to concentrate the deflection of the resilient retaining means 6 at the center of that portion of the retaining means which lies within the perforation 2. Since the resilient retaining means 6 is suitably anchored in the perforations 5 at its ends, it will be evident that this central portion of the resilient retaining means will be the portion most readily deflectable. In this way the greatest strain on the resilient retaining means will not occur adjacent its anchored end portions, and shearing forces at the anchored end portions will be obviated. As will be well understood by the worker in the art, the resilient retaining means 6 will be located toward the rear edge of the cutter bit shank, and preferably toward the lower end thereof. This results in the urging of the lower end of the bit shank in the forward direction against the front surface of the perforation, i.e. in the direction of cutting, while permitting the upper portion of the rear edge of the cutter bit shank to come to rest against the rear upper surface of the socket member perforation 2 so as to withstand the rearward strains of the cutting operation. The downward strains of this operation will be resisted by the abutment means 11. When the bit is pried out, as by a tool engaged between the undercut shoulder 3a and the upper surface of the socket member, the reverse of the above actions will occur.

There are various ways in which the shank of a cutter bit or bit holder may be configured to coact with the resilient engagement means illustrated in FIGS. 1–3 inclusive. One of these ways is shown in FIG. 4, where the shank 4a has a slot 12 the upper end of which is forwardly directed as at 13. This provides an engagement surface indicated at 14; and the coaction of the resilient engagement means 6 with this engagement surface is illustrated in the same figure where the resilient means is shown in section.

A modified structure is shown in FIGS. 5, 6 and 7. The block or socket member 1 has the shank receiving perforation 2 as before. The hole 5a is in this instance of non-circular cross-section. The resilient engagement member, which is illustrated in FIG. 6, in this instance comprises a metallic or other resilient rod-like means 15, end portions of which are formed in a non-circular fashion so as to fit the hole 5a. These end portions 16 and 17 may be integral with the rod-like member 15, or they may be separate pieces added thereto and fastened in any suitable way. Where the rod-like member 15 is of metal, the end pieces 16 and 17 may be of resilient rubbery substance such as natural rubber, any of the synthetic rubbers or a chloroprene such as neoprene. The end pieces if desired may be vulcanized or otherwise hardened against the rod. The purpose of the end pieces is simply to form a mounting for the rod 15 in the hole 5a, while permitting the hole 5a to be large enough to pass the expanded central portion of the rod-like member. Consequently, it is not necessary that the rod-like member be so mounted with respect to the socket member as to permit any bodily displacement within the hole 5a.

The central portion of the rod-like member is split into two parts as indicated at 15a and 15b. These parts are so shaped as to be separated as shown; and the substance of the rod-like member 15 is resilient enough so that a substantial force is required to bring the separated parts 15a and 15b closer together. The non-circular configuration of the hole 5a and the non-circular configurations of the end portions 16 and 17 of the resilient retaining means coact also to keep the separated portions 15a and 15b of the rod-like member oriented in a plane generally normal to the axis of the shank-receiving perforation 2 of the socket member 1.

The structures shown in FIGS. 5 and 6 may be employed with a cutter bit or bit holder having a shank 18 configured as shown in FIG. 7. Here the shank has a central slot 19 extending upwardly from its lower end and terminating in an enlarged opening 20. At the juncture of the slot and opening there are operating surfaces 21 and 22. The portions of the shank 18 adjacent the lower end of the slot 19 are rounded or chamfered as indicated at 23 and 24. The slot 19 in the shank will be located in such fashion that it will lie in a plane parallel to the axis of the perforation 2 of the socket member and embracing also the axis of the rod-like member 15. As will now be evident to one skilled in the art, when the cutter bit has its shank 18 inserted into the shank receiving perforation 2 and is driven home, the chamfered surfaces 23 and 24 will first engage the separated portions 15a and 15b of the resilient retaining means, urging these portions toward each other until the effective width of the resilient retaining means is such that it will enter the slot 19. During the further descent of the shank, the resilient engagement means will pass through the slot 19 and come into the enlarged opening 20. The descent of the cutter bit or cutter bit holder will be stopped by the engagement of abutment surfaces 25 and 26 with the top of the socket member 1; and at this point the separated portions 15a and 15b of the resilient member engage the operating surfaces 21 and 22 of the bit shank, urging the shank downwardly in the perforation 2.

The gauge-determining abutments 25 and 26 limit the descent of the shank in the perforation enabling the portions 15a and 15b of the resilient retaining means to exert a constant downward force on the operating surfaces 21 and 22. The use of the resilient retaining means does not interfere with such tilting or other movement of the shank in the perforation as may be required to bring about the normal coaction of surfaces to withstand the strains of the cutting operation.

By applying an upward prying force to the bit, it may be removed from the socket and replaced. When such a force is applied to the cutter bit, the operating surfaces 21 and 22 will urge the parts 15a and 15b of the resilient retaining means 15 toward each other, until the effective width of the resilient retaining means is such that it will pass through the slot 19, thereby freeing the cutter bit from the socket member.

Another modification of the present invention is shown in FIGS. 8, 9 and 10. A block or socket member 27 has a shank receiving perforation 28. A hole 29 extends from the rear end of the block to the perforation 28 generally perpendicular to the axis of the perforation 28. A resilient member 30, of any suitable material such as nylon, neoprene or belting, extends through the hole 29 into the perforation 28. The resilient member 30 may be of any suitable cross-section, such as circular, or rectangular, with its longer cross-sectional dimension substantially perpendicular to the axis of the perforation 28. The hole 29 will be of such cross-sectional configuration as to receive and engage the resilient member 30 snugly. This engagement may be sufficiently tight to hold the resilient member in place. However, it does not amount to a deprature from the spirit of the invention to provide the rear end of the socket member 27 with a removable plate, clip or like means to prevent endwise displacement of the resilient member 30. If the resilient member has a rectangular cross-section as described above (i.e. if it is made of belting or the like), it may be held in place by a pin 31 extending through a hole 32 in the socket member and a hole in the resilient member 30 as shown in dotted lines in FIG. 8. It is also within the scope of the invention to provide the resilient means 30 with means outside the socket member (such as the head 34 shown in dotted lines) to permit it to be engaged by a tool when being inserted or replaced.

A cutter bit 35 for use with the socket member 27 is illustrated in FIG. 10. The lower part of the rear edge of the shank 35a is provided with an inwardly and downwardly sloping surface 36. A second downwardly and outwardly sloping surface 37 forms an angle of approximately 90° with the surface 36. The bit will be provided with one or more gauge-determining abutments 38.

As will be evident from FIG. 10, when the shank 35a of the bit 35 is inserted in the porforation 28, the resilient member 30 will be deflected by the bottom surface 39 of the shank 35a. Upon further lowering of the shank, the resilient member will clear the corner of the shank formed by the surfaces 39 and 37 whereupon the end of the resilient member will snap into an abutting position against the surface 37 and the lower portion of the surface 36. Further downward movement of the shank will be prevented by contact of the socket member with the gauge-determining abutment 38. When the shank is fully seated, the coaction of the resilient member and the surfaces 36 and 37 results in the urging of the lower end of the shank in the forward direction (direction of cutting) against the lower front surface of the perforation 28 while permitting the upper portion of the rear surface of the shank to rest against the upper rear surface of the perforation to withstand the rearward strains of the cutting operation. The downward strains of this operation will be resisted by the abutment 38.

To remove the bit from the socket member, an upward prying force is applied to the bit. As the shank moves upwardly, the surface 37 will cause the resilient member 30 to buckle (as shown in dotted lines in FIG. 10), until it snaps downwardly over the corner formed by the surfaces 37 and 39, thereby releasing the shank from the perforation 28.

A modified structure is illustrated in FIG. 11. This structure differs from that of FIGS. 8, 9 and 10 only in the manner in which the resilient member is mounted in the socket member. Therefore, elements similar to those shown in FIGS. 8-10 are given like index numerals. In this embodiment a large threaded hole 40 extends from the perforation 28 through the rear portion of the socket member. A resilient member 30 similar to that shown in FIGS. 9 and 11 is embedded in a hole in the threaded portion of a screw 41. The resilient member is held in place in the socket member by the screw 41 which is threaded in the hole 40 until the resilient member is properly placed with respect to the perforation 28. The resilient member is not only somewhat adjustable but is easily removed and replaced by removing the screw from the hole 40 and inserting a new assembly. A broken or worn resilient member may be replaced in the screw 41.

Another embodiment is illustrated in FIGS. 13 to 15. A socket member 43 (FIG. 12) is provided with a shank receiving perforation 44. A cutter bit 45 with a head 46 and a shank 47 is shown in FIG. 13. The shank 47 has parallel front and rear surfaces 48 and 49. The lower portion of the surface 49 represents a notch as defined by the surfaces 51, 52 and 53. The lower portion of the surface 49 presents a notch as defined by the surfaces 55, 56 and 57. It will further be noted that the surfaces 53 and 57 slant downwardly and away from the axis of the shank 47. The lowermost portion of the shank is V-shaped as defined by the surfaces 58 and 59.

A resilient member 60 is illustrated in FIG. 14 and comprises a rectangular block of resilient material such as belting or natural and artificial rubbers, chloroprenes, plastics, such as nylon, Teflon or the like. The resilient member 60 is of a uniform thickness which is preferably somewhat greater than that dimension of the notches in the shank defined by the surfaces 52 or 56 and their adjacent surfaces respectively. The resilient member contains a centrally located hole 61, the dimensions of which may be slightly smaller than the cross-sectional dimensions of that part of the shank lying between surfaces 52 and 56. Slits 61a can be formed at the ends of the hole if desired.

FIG. 15 shows the bit 45 engaged in the socket member 43. This may be accomplished by inserting the bit into the perforation. When the bit 45 is fully seated, that part of the shank containing the notches may extend below the bottom surface of the socket member with the surfaces 51 and 55 on the shank essentially flush with the bottom surface of the socket member. Further downward movement of the bit is prevented by the abutment surface 62 resting on the top surface of the socket member. Holding the bit in seated position, the resilient member 60 may be engaged with the bit by placing it over the diminished end of the shank and forcing it upwardly until it engages in the notches. It will be seen from FIG. 15 that since the thickness of the resilient element 60 is greater than the length of the shank surfaces 52 and 56, the resilient member will in part engage the downwardly and outwardly slanted surfaces 53 and 57 thereby exerting a constant downward force on the shank 47.

The above mode of installation implies access to the bottom of the socket member, which is not always possible. Consequently, it is preferable to have the member 60 affixed to the socket member, which may be done in various ways as by adhesive, studs or clips. Yet another expedient is to mill or broach a slot in the socket member to accept the resilient means 60, such a slot being indicated in dotted lines at 62 in FIG. 12.

Modifications may be made in the invention without departing from the spirit of it. The invention having been described in various embodiments, what is claimed as new and desired to be secured by Letters Patent is:

1. In combination a socket member and a cutter bit, said socket member having a perforation therein to receive the shank of said cutter bit, and means for retaining said shank in said perforation, said means having a portion engaged with said socket member outside the confines of said perforation, and another portion extending freely substantially across said perforation and substantially perpendicular to the axis of said perforation, said last mentioned portion being deformable by reason of its inherent resilience, and said cutter bit having a shank adapted to enter said perforation, abutment means on said cutter bit adapted to cooperate with said socket member to define a seated position of said shank, a first surface on said shank for deflecting said deformable portion of said retaining means within said perforation during insertion of said shank into said perforation, a second surface on said shank to be engaged by said deformable portion of said retaining means when said cutter bit is in said seated position, said second surface and said abutment means being spaced with respect to each other by a distance such that said deformable portion of said resilient means will exert a downward force on said shank when said cutter bit is in said seated position.

2. The structure claimed in claim 1 wherein said deformable portion is located wholly within said perforation.

3. The structure claimed in claim 1 wherein said resilient retaining means is a rod-like member extending across said perforation and having end portions engaged in said socket member beyond the confines of said perforations.

4. The structure claimed in claim 1 wherein said resilient means is a strand-like element having a portion engaged in an orifice in said socket member and another portion extending freely within said perforation or a projection thereof.

5. The structure claimed in claim 3 wherein said resilient retaining means is a rod-like member of tough and resilient plastic.

6. The structure claimed in claim 3 wherein said resilient retaining means is in the form of a split rod having the split portions within the perforation resiliently urged away from each other.

7. The structure claimed in claim 3 wherein said resilient retaining means is in the form of a split rod having the split portions within the perforation resiliently urged away from each other, and in which the shank of said cutter bit has a first recess portion to accept said rod-like member during insertion of the shank in the perforation and a second recess portion to accept said split portion in expanded position.

8. The structure claimed in claim 3 wherein said resilient retaining means is in the form of a split rod having the split portions within the perforation resiliently urged away from each other, and in which the shank of said cutter bit has a first recess portion to accept said rod-like member during insertion of the shank in the perforation and a second recess portion to accept said split portion in expanded position, said combination including means for preventing rotation of said rod-like member with respect to said socket member.

9. The structure claimed in claim 4 in which said strand-like element throughout a portion of its length is engaged in a member threaded into a hole transverse to said perforation.

References Cited by the Examiner

UNITED STATES PATENTS

| | | | |
|---|---|---|---|
| 688,945 | 12/1901 | De Grave | 299—88 |
| 796,798 | 8/1905 | Blaine | 37—142 |
| 1,052,077 | 2/1913 | McMillan | 279—79 |
| 1,348,917 | 8/1920 | Wittech | 279—79 |
| 1,938,860 | 12/1933 | Renfer | 279—79 |
| 2,412,330 | 12/1946 | Glans et al. | 279—79 |
| 2,521,089 | 9/1950 | Phipps | 262—870 |
| 2,549,105 | 4/1951 | Mackensen | 279—79 |
| 2,651,108 | 9/1953 | Weems | 279—79 |
| 2,720,712 | 2/1955 | Snyder et al. | 262—860 |
| 2,747,852 | 5/1956 | Krekeler | 262—860 |
| 2,855,206 | 10/1958 | Haviland. | |
| 2,907,559 | 10/1959 | Brown et al. | 299—92 |
| 2,965,365 | 12/1960 | Krekeler | 262—860 |
| 2,990,634 | 7/1961 | Eyolfson | 37—142 |
| 3,093,366 | 6/1963 | Proctor | 262—860 |
| 3,155,428 | 11/1964 | Proctor | 299—92 |

CHARLES E. O'CONNELL, *Primary Examiner.*

BENJAMIN HERSH, *Examiner.*